United States Patent [19]

Cser et al.

[11] 4,353,211
[45] Oct. 12, 1982

[54] CONDUIT SYSTEM FOR INTRODUCING INTAKE GASES IN INTERNAL COMBUSTION ENGINES

[75] Inventors: Gyula Cser, Budapest, Hungary; Fritz Spinnler, Liestal, Switzerland

[73] Assignee: Autóipari Kutató Intézet, Budapest, Hungary

[21] Appl. No.: 104,025

[22] Filed: Dec. 17, 1979

[30] Foreign Application Priority Data

Dec. 21, 1978 [HU] Hungary .................. AU 415

[51] Int. Cl.³ ................ F02B 27/00; F02B 37/00
[52] U.S. Cl. .................... 60/605; 123/52 M
[58] Field of Search ........... 123/52 M, 52 MB, 559; 60/598, 605

[56] References Cited

U.S. PATENT DOCUMENTS

| | | | |
|---|---|---|---|
| 2,740,389 | 4/1956 | Reyl | 123/52 M |
| 3,298,332 | 1/1967 | Elsbett | 123/52 M |
| 3,796,048 | 3/1974 | Annus et al. | 60/598 |
| 4,179,892 | 12/1979 | Heydrich | 60/605 |

FOREIGN PATENT DOCUMENTS

| | | | |
|---|---|---|---|
| 1263608 | 5/1961 | France | 123/52 M |
| 161323 | 6/1973 | Hungary | 60/598 |
| 852311 | 10/1960 | United Kingdom | 123/52 M |
| 379776 | 7/1973 | U.S.S.R. | 123/52 M |
| 498407 | 3/1976 | U.S.S.R. | 123/52 M |

Primary Examiner—Michael Koczo, Jr.
Attorney, Agent, or Firm—Spencer & Kaye

[57] ABSTRACT

An internal combustion reciprocating engine includes an intake gas conduit system for supplying each engine cylinder with intake gas. Maximum four engine cylinders whose suction cycles are in a substantially non-overlapping relationship with one another form a cylinder group. The intake gas conduit system has a feed resonator vessel communicating with the intake opening of each cylinder of the cylinder group, a dampening vessel having an intake gas inlet opening and a feed resonance tube maintaining communication between the feed resonator vessel and the dampening vessel. The feed resonator vessel and the feed resonance tube form a first oscillating system in which intake gas oscillations are generated by the effect of periodic suction cycles of the cylinders forming the cylinder group. The intake gas conduit system further has a closed resonator vessel and an equalizing resonance tube maintaining communication between the dampening vessel and the closed resonator vessel. The closed resonator vessel and the equalizing resonance tube form a second oscillating system in which intake gas oscillations are generated by the oscillations taking place in the first oscillating system.

5 Claims, 5 Drawing Figures

CONDUIT SYSTEM FOR INTRODUCING INTAKE GASES IN INTERNAL COMBUSTION ENGINES

BACKGROUND OF THE INVENTION

This invention relates to an internal combustion reciprocating engine having an intake gas conduit system which improves the charging of the cylinders by utilizing oscillations of the gases.

The output or the mean effective pressure of internal combustion reciprocating engines are fundamentally affected by the quantity of the charge introduced into the engine cylinders. In Otto-engines the charge is, during the suction cycle, introduced into each engine cylinder through the intake opening thereof as intake gas formed of an air-fuel mixture. In diesel engines, the intake gas entering the cylinder during its suction cycle generally contains no fuel, or has only such a small fuel quantity that the resulting air-fuel mixture ratio is insufficient for self-ignition. The still missing fuel proportion or the entire fuel quantity is added into the cylinder to the intake gas at the end of the compression cycle, whereby the combustion charge is formed. For this reason by "intake gas" entering the cylinder through its intake opening there is meant here—dependent upon the system and mode of operation of the engine—either air or an air-fuel mixture.

For the purpose of increasing the mean effective pressure of an internal combustion engine, methods are known according to which oscillations appearing in the intake gas conduit system coupled to the intake openings of the engine cylinders are utilized for increasing (intensifying) the combustion charge of the cylinders. The intake gas oscillations generated by the discontinuous suction effect of the engine cylinders may be particularly advantageously utilized in intake gas conduit systems in which at the most four engine cylinders—whose suction cycles do not significantly overlap one another—are connected with a common resonator vessel which communicates with at least one resonance tube. The oscillating system composed of the resonator vessel and the resonance tube has a certain natural frequency. If the natural frequency of the system at least approximately corresponds to the frequency of the discontinuous, periodical suction effected by the cylinders, the gas oscillations generated by this periodical suction are amplified to a substantial extent and are utilized for increasing the charge for the cylinders.

The internal combustion engines, however, do not, as a general rule, draw the air required for the intake gas directly from the surrounding atmosphere; rather, to the intake gas conduit there is coupled an air filter and, in some instances, there is also attached a particular charging device. In such cases between the resonance tube and the filter element of the air filter or between the resonance tube and the charging device an arrangement has to be installed which defines a volume serving for the dampening of the oscillations of the combustion gas. The purpose is, in part, to ensure that the choking effect of the mentioned devices does not adversely affect the gas oscillations generated in the oscillating system and, in part, to ensure that the gas oscillations do not adversely affect the proper operation of the charging device or the air filter. Intake gas conduit systems of these types are disclosed, for example, in Hungarian Pat. No. 161,323 and U.S. Pat. No. 3,796,048. In these known arrangements the first, second and third cylinders of a six-cylinder series engine on the one hand and its fourth, fifth and sixth cylinders on the other hand, form two cylinder groups. The suction cycles of the individual cylinders forming one and the same group do not overlap. The intake openings of the cylinders belonging to one and the same group are coupled with a common resonator vessel and to each resonator vessel there is coupled a resonance tube. The resonance tubes are connected with one another by means of a common dampening vessel. The intake gas inlet opening of the dampening vessel communicates with the pressure side of the charging device by means of a coupling conduit.

By virtue of the usual firing sequence of 1-5-3-6-2-4 of six-cylinder engines and the usual firing intervals, the suction cycles within each cylinder group are 240° apart (expressed as the angle of rotation of the engine crank shaft). At the same time the suction cycles of the two cylinder groups are offset by 120°, that is, by exactly one-half phase. This means that likewise, the intake gas oscillations generated in the oscillating systems of the separate cylinder groups are shifted one-half phase with respect to one another. Thus, when in the resonator vessel of the one cylinder group there prevails the maximum of the pressure oscillation, in the other group, at the same time, a pressure minimum will prevail. The situation is similar at the inlet openings of the resonance tubes at the dampening vessel: when at the inlet opening of the one resonance tube associated with the one cylinder group there prevails the maximum intake gas velocity in the direction of the cylinder group, then at the inlet opening of the resonance tube belonging to the other cylinder group a maximum but oppositely oriented intake gas velocity prevails (that is, the last-named velocity is oriented towards the dampening vessel). The non-steady mass flows caused by the intake gas oscillations therefore equalize one another at the dampening vessel. At the intake gas inlet opening of the dampening vessel there is thus obtained a steady intake gas velocity which corresponds to the intake gas consumption of the engine and in the dampening vessel a steady pressure level prevails. This steady pressure level provides the necessary boundary conditions for the intake gas oscillations appearing in the oscillating system, whereas the steady mass flow which is set at the intake gas inlet opening of the dampening vessel ensures a steady operation and good efficiency of the turbocharger. For achieving the above-described equalization and oscillation dampening, a very small dampening volume is sufficient, because the size of the volume does not play a significant role in the equalization. The structural advantages derived from this circumstance are apparent: no difficulties will be encountered in installing a dampening vessel of small volume at the engine.

The situation is fundamentally different in engines where each cylinder group has its own, separate dampening vessel; that is, to one dampening vessel there is connected only a single resonance tube serving one cylinder group. Such internal combustion engines are one, two, three and four-cylinder engines and also multi-cylinder engines in which, for constructional reasons, the coupling of more than one resonance tube to the dampening vessel is not possible or is impractical. In such engines, because of the intake gas oscillations generated in the resonator vessel and the resonance tube associated with the respective cylinder group (that is, oscillations generated in the oscillating system) a non-steady suction, that is, a pulsating mass flow appears in the dampening vessel associated with the respective cylinder group. In order to ensure that despite such a non-steady suction a relatively steady pressure level is set in the dampening vessel and further, a relatively steady intake gas velocity is set at the intake gas inlet opening of the dampening vessel, the volume of the dampening vessel has to be very large: it has to be thirty to fifty-fold the total swept volume of the engine and therefore could amount to as much as 100 liters. Consequently, it is very difficult to accommodate such large dampening vessels and thus, in engines of the last-discussed type intake gas conduit systems enhancing cylinder charging by intake gas oscillations as described above could not be used.

SUMMARY OF THE INVENTION

It is an object of the invention to eliminate the above-discussed drawback by providing an improved intake gas conduit system of the above-outlined type in which, in each dampening vessel associated with the separate cylinder groups of the engine, a steady pressure level is ensured even if the volume of the dampening vessel is small.

Thus, the invention seeks to provide an internal combustion reciprocating engine which has an improved intake gas conduit system utilizing intake gas oscillations for improving the charging of the cylinders. The intake openings of not more than four cylinders which constitute a cylinder group whose intake cycles do not significantly overlap, are connected with a common feed resonator vessel that supplies the cylinder group with intake gas and further, the feed resonator vessel is, by means of a feed resonance tube, in communication with a dampening vessel associated with the respective cylinder group and is further provided with an intake gas inlet opening.

The above object and others to become apparent as the specification progresses, are accomplished by the invention, according to which, briefly stated, the dampening vessel is, by means of an equalizing resonance tube, coupled to an otherwise closed resonator vessel and the latter, together with the equalizing resonance tube, forms an oscillating system which is caused to oscillate by the gas oscillations of the oscillating system formed of the feed resonator vessel and the feed resonance tube.

According to an advantageous further feature of the invention, the natural frequency of the oscillating system formed of the closed resonator vessel and the equalizing resonance tube is at least approximately equal to the natural frequency of the oscillating system formed of the feed resonator vessel and the feed resonance tube.

In accordance with a further advantageous feature of the invention, the cross-sectional areas of the equalizing resonance tube and the feed resonance tube which open into the dampening vessel, are oriented towards one another and further their axes are at least approximately in alignment with one another.

It is a further advantageous feature of the invention to provide that the dampening vessel is constituted by a vessel which has another original function. Such a vessel may be, for example, the housing of the air filter.

It is a further advantageous feature of the invention to connect the intake gas inlet opening of the dampening vessel to the presssure side of a charging device. Expediently, the charging device is a turbocharger having an exhaust gas-driven turbine. It is a further feature of the invention to arrange the air cooler of the charging device in the dampening vessel. According to a further feature of the invention, the dampening vessel itself provides the cooling chamber of the cooler.

In the internal combustion reciprocating engine structured according to the invention, by virtue of the periodic suction effect of the cylinders belonging to one and the same cylinder group, there is generated an oscillation of the intake gas flowing in the feed resonator vessel and feed resonance tube belonging to the same cylinder group. These intake gas oscillations improve the charging of the engine and simultaneously generate a non-steady suction effect in the dampening vessel associated with that cylinder group, whereby pressure oscillations are obtained in the dampening vessel. By virtue of pressure oscillations even of very small amplitude appearing in the dampening vessel, oscillations are generated in the equalizing oscillating system which is coupled to the dampening vessel and which is formed of the equalizing resonance tube and the closed resonator vessel communicating therewith. This oscillation in the last-named system is such that under the effect of a momentary pressure increase in the dampening vessel, the system is filled with intake gas and in the closed resonator vessel the intake gas pressure increases. In the second half of the cycle of oscillation, when in the dampening vessel a momentary pressure drop should appear, the intake gas flows from the closed resonator vessel through the equalizing resonance tube back into the dampening vessel. Thus, at the moment in which the feed resonance tube draws intake gas with maximum velocity from the dampening vessel, from the equalizing resonance tube intake gas arrives with maximum velocity into the dampening vessel and thus equalizes the non-steady suction and maintains the pressure oscillations appearing in the dampening vessel within acceptable limits. At the same time, a relatively steady inflow of intake gas through the inlet opening of the dampening vessel is also ensured.

The above-described equalizing effect of the oscillating system formed of the closed resonator vessel and the equalizing resonance tube is effective over the entire speed range of the engine provided the natural frequency of this oscillating system is at least approximately equal to the natural frequency of the oscillating system formed of the feed resonator vessel and the feed resonance tube. The equalizing effect is particularly good if the cross-sectional areas of the feed resonance tube and the equalizing resonance tube opening into the dampening vessel are oriented towards one another and they are arranged at least approximately in axial alignment with one another. In such a case the kinetic energy of the intake gas exiting the feed resonance tube is utilized directly for generating oscillations in the oscillating system formed of the equalizing resonance tube and the closed resonator vessel, whereby flow losses of the system may be significantly reduced. A similar advantage is obtained at the moment in which the feed resonance tube draws the intake gas with the maximum velocity from the dampening vessel, because the kinetic energy of the intake gas exiting at that moment from the equalizing resonance tube with the maximum velocity can be utilized directly in the feed resonance tube.

It follows from the foregoing discussion that as an effect of the non-steady flow, in the dampening vessel no appreciable pressure oscillations will be generated; the intake gas oscillations occur between the two oscillating systems, that is, between the feed system and the equalizing system.

DESCRIPTION OF THE PREFERRED EMBODIMENTS

Figure 1:
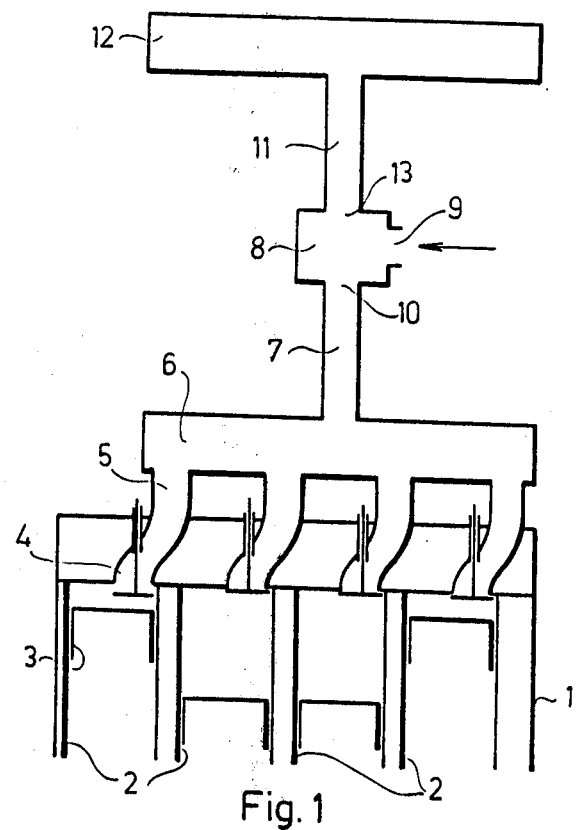
FIGS. 1 through 5 are schematic views of five preferred embodiments of the invention associated with a four-cylinder internal combustion reciprocating engine.

Turning now to FIG. 1, there is schematically illustrated the cylinder block 1 of a four-cycle, four-cylinder internal combustion reciprocating engine having a firing interval of 180°; that is, the suction cycles of the cylinders 2 of the engine do not significantly overlap. Therefore, the intake openings 4 of the four cylinders 2—which constitute one cylinder group—may be coupled to a common feed resonator vessel 6. The intake openings 4 of the cylinders 2 may be connected directly with the feed resonator vessel 6; in the illustrated embodiment, however, the intake openings 4 are connected with the feed resonator vessel 6 with the intermediary of an intake conduit 5. To the feed resonator vessel 6 there is coupled a feed resonance tube 7 which, in turn, communicates with a dampening vessel 8. The latter has an intake gas inlet opening 9. The feed resonance tube 7 is in communication with the dampening vessel 8 through a cross-sectional area 10 constituting the inlet opening of the feed resonance tube 7 into the dampening vessel 8. To the dampening vessel 8 there is connected an equalizing resonance tube 11 in such a manner that the cross-sectional area 13 of the equalizing resonance tube 11 constituting the inlet opening of the equalizing resonance tube 11 into the dampening vessel 8 and the cross-sectional area 10 of the feed resonance tube 7 are oriented towards one another and have coinciding axes. The equalizing resonance tube 11 is coupled to an otherwise closed resonator vessel 12. The equalizing resonance tube 11 and the closed resonator vessel 12 form an oscillating system which has at least approximately the same natural frequency as the oscillating system formed of the feed resonator vessel 6 and the feed resonance tube 7. Oscillations are generated in the last-named oscillating system (feed system) by the pistons 3 of the cylinders 2, as these pistons periodically execute their suction strokes.

The intake gas oscillations thus generated are utilized by the engine for improving the charge of the cylinders 2. These intake gas oscillations cause in the feed resonance tube 7 an intake gas flow of alternating direction. As a result, during a certain portion of each cycle of the oscillation, intake gas is drawn with high velocity from the dampening vessel 8 through the intake opening 10 of the feed resonance tube 7, while in the second half period of each cycle of the oscillation intake gas flows back with high velocity in the opposite direction. Thus, during this return flow the intake gas jet flowing from the opening 10 of the feed resonance tube 7 through the oppositely lying opening 13 enters the equalizing resonance tube 11. By virtue of the fact that the cross-sectional areas 10 and 13 are oriented opposite one another and have coinciding axes, the kinetic energy of the intake gas is utilized directly for generating oscillations in the oscillating system formed by the equalizing resonance tube 11 and the closed resonator vessel 12. During this occurrence, the closed resonator vessel 12 is filled with intake gas of high pressure. In the successive portion of the cycle of the intake gas oscillation, when the intake gas flows through the opening 10 of the feed resonance tube 7 with continuously increasing velocity in the direction of the feed resonator vessel 6, the intake gas accumulated in the closed resonator vessel 12 begins, by virtue of the effect of its own pressure, also to flow with continuously increasing velocity through the opening 13 of the equalizing resonance tube 11 into the dampening vessel 8. Here too, the kinetic energy of the intake gas flowing from the opening 13 of the equalizing resonance tube 11 into the dampening vessel 8 is directly utilized for generating the flow in the feed resonance tube 7. As a result, the non-steady flow caused by the oscillations of the intake gas occurs in essence between the two oscillating systems, that is, between the feed oscillating system formed of the feed resonator vessel 6 and the feed resonance tube 7 and the equalizing oscillating system formed of the equalizing resonance tube 11 and the closed resonator vessel 12. Thus, the intake gas enters the dampening vessel 8 through the intake gas inlet opening 9 with an approximately steady velocity, that is, at the opening 9 there prevails a steady velocity and in the dampening vessel 8 there prevails an approximately constant pressure. The latter circumstance ensures the conditions necessary for the intake gas oscillations that take place in the feed oscillating system, while the at least approximately constant velocity which is set at the intake gas opening 9 provides the precondition for the intended functioning of the usual accessories connected to the opening 9, such as an air filter (not shown in FIG. 1).

Since during the above-described equalization of the intake gas oscillations the volume of the dampening vessel 8 plays no significant role, the dampening vessel 8 may be of arbitrarily small dimensions complying with the usual, gas-dynamically determined requirements. As a result, constructional difficulties in arranging or in installing the dampening vessel 8 disappear, since a small dampening vessel can find easy accommodation in the space available at the engine.

Figure 2:
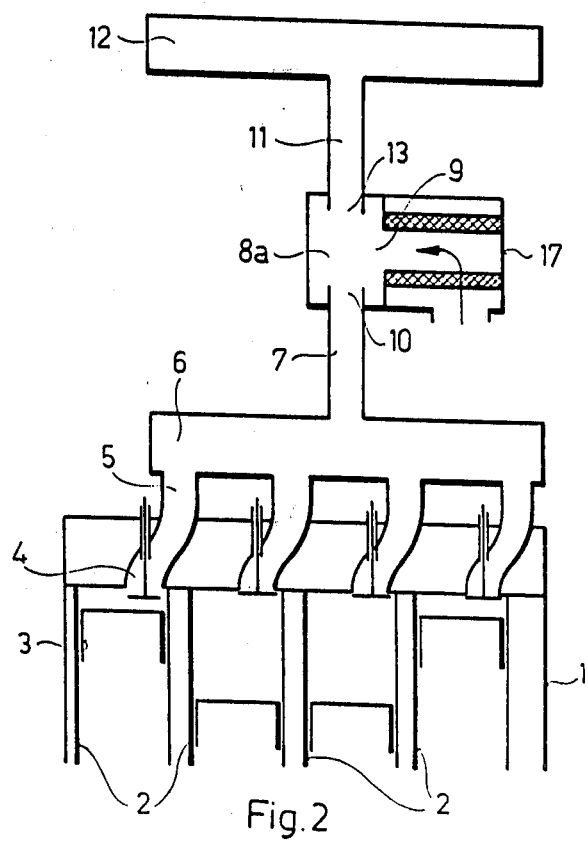

Further, it is feasible to provide that the dampening vessel is constituted by a receptacle which already has another primary function. Accordingly, in FIG. 2 there is shown a further preferred embodiment of the invention in which the dampening vessel 8a is constituted by a housing 17 of an air filter.

Figure 3:
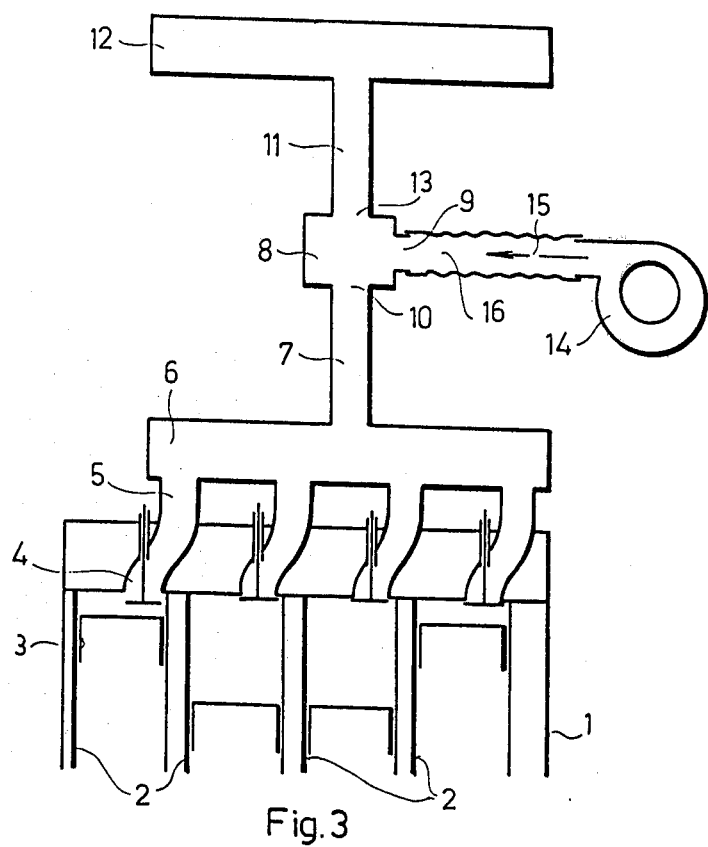

Turning now to FIG. 3, there is shown a four-cylinder engine in which the intake gas opening 9 of the dampening vessel 8 communicates, by means of a conduit 16, with the pressure side 15 of a charging device 14 which may be a turbocharger including a turbine driven by exhaust gases. It is to be understood that the opening 9 of the dampening vessel 8 may be connected with the pressure side 15 of a charging device 14 other than the above-noted exhaust gas turbine turbocharger. In any event, the approximately constant intake gas velocity which is set at the opening 9 provides for favorable conditions for the operation of the charging device 14.

If, between the charging device 14 and the intake gas opening 9 of the dampening vessel there are coupled other customary accessories, for example, a charging air cooler (not shown in FIG. 3), the steady velocity of the intake gas will have a favorable effect on the operation of this component also. It is to be understood that in the intake gas conduit system there may be provided additional accessories required for the operation of the engine, for example, in case of an Otto-engine, there may be provided fuel injection or carburating devices as well as a butterfly valve for controlling the flow rate of the intake gas.

Figure 4:
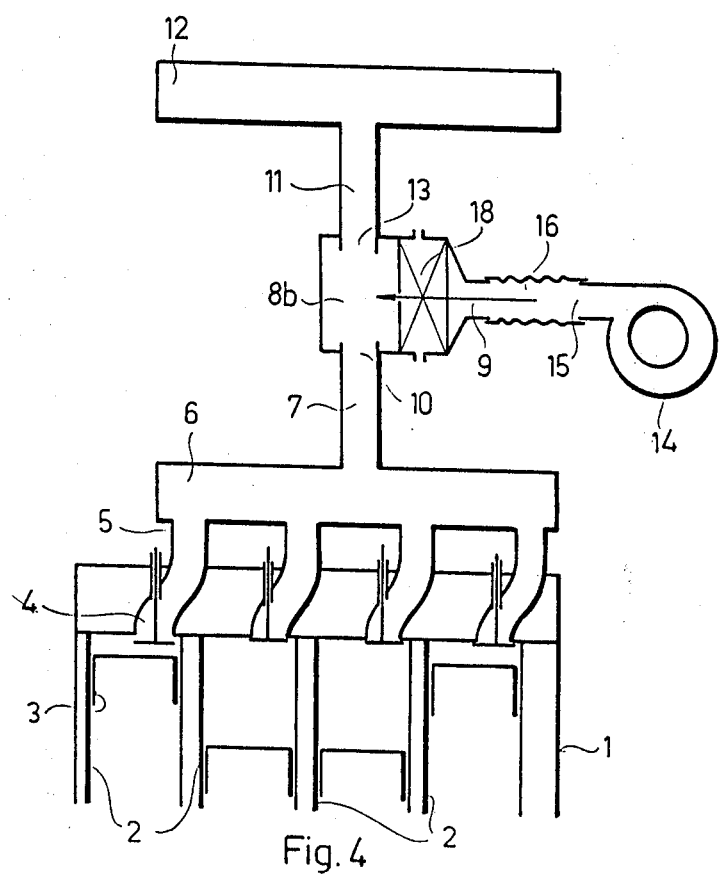

Turning now to FIG. 4, there is shown a further preferred embodiment of the invention in which a charging air cooler 18 is arranged within the dampening vessel 8b. This arrangement is of particular advantage when air-to-water heat exchangers are used.

Figure 5:
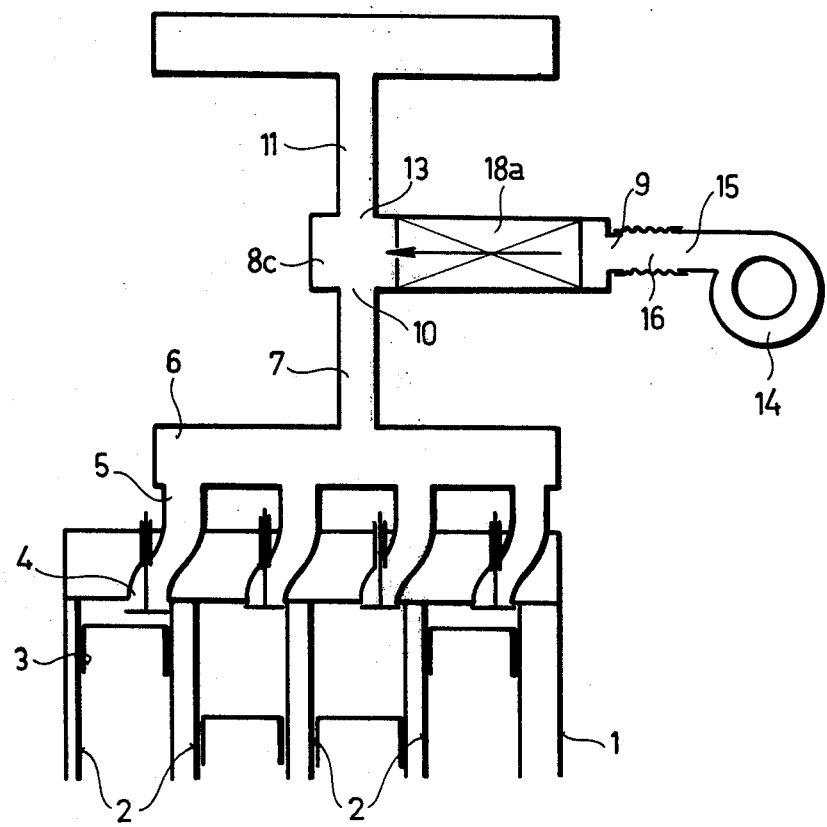

In FIG. 5 there is shown an embodiment wherein the dampening vessel 8c constitutes a charging air chamber of the charging air cooler 18a. This feature provides for a compact arrangement particularly for air-to-air heat exchangers. It is noted that the embodiments illustrated in FIGS. 2 through 5 operate as described in connection with the embodiment illustrated in FIG. 1.

It will be understood that the above description of the present invention is susceptible to various modifications, changes and adaptations, and the same are intended to be comprehended within the meaning and range of equivalents of the appended claims.

What is claimed is:

1. In an internal combustion engine including engine cylinders with respective pistons reciprocating therein; an intake gas conduit system for supplying each engine cylinder with intake gas through an intake opening thereof; maximum four engine cylinders whose suction cycles are in a substantially non-overlapping relationship with one another forming a cylinder group; the improvement wherein said intake gas conduit system comprises in combination
   (a) a dampening vessel having an intake gas inlet opening;
   (b) a first oscillating system in which intake gas oscillations are generated by the effect of periodic suction cycles of the cylinders forming the cylinder group; said first oscillating system having a natural frequency and consisting of
   (1) a feed resonator vessel communicating with the intake opening of each cylinder of said cylinder group;
   (2) a feed resonance tube having first and second ends; said feed resonance tube communicating, with said first end thereof, with said dampening vessel and further communicating, with said second end thereof, with said feed resonator vessel; and
   (c) a second oscillating system in which intake gas oscillations are generated by the oscillations taking place in said first oscillating system; said second oscillating system having a natural frequency being at least approximately identical to the natural frequency of said first oscillating system; said second oscillating system consisting of
   (1) a closed resonator vessel; and
   (2) an equalizing resonance tube having first and second ends; said equalizing resonance tube communicating, with said first end thereof, with said dampening vessel and further communicating, with said second end thereof, with said closed resonator vessel; said first end of said feed resonance tube and said first end of said equalizing resonance tube being spaced from, and being oriented towards, one another across said dampening vessel.

2. An internal combustion engine as defined in claim 1, wherein said feed resonator vessel is directly connected to the intake opening of each cylinder.

3. An internal combustion engine as defined in claim 1, wherein said first end of said feed resonance tube and said first end of said equalizing resonance tube are at least approximately in axial alignment with one another.

4. An internal combustion engine as defined in claim 1, further comprising a charging device having a pressure side communicating with said intake gas inlet opening of said dampening vessel.

5. An internal combustion engine as defined in claim 4, wherein said charging device is an exhaust gas turbine-type turbocharger.

* * * * *